United States Patent [19]

Chappell

[11] 4,023,041
[45] May 10, 1977

[54] APPARATUS FOR GENERATING ELECTRICITY AND POWER FROM NATURAL WATER FLOW

[76] Inventor: Walter L. Chappell, 700 Gears Road, No. 169, Houston, Tex. 77067

[22] Filed: Mar. 1, 1976

[21] Appl. No.: 662,546

[52] U.S. Cl. .................................. 290/53; 290/42; 416/198 R
[51] Int. Cl.² ........................................ F03B 13/12
[58] Field of Search .............................. 290/42–44, 290/53–55; 416/120, 121, 122, 133, 198, 33

[56] References Cited

UNITED STATES PATENTS

| | | | |
|---|---|---|---|
| 1,219,339 | 3/1917 | Manning | 290/44 |
| 2,097,286 | 10/1937 | McGee | 290/54 |
| 3,912,938 | 10/1975 | Filipenco | 290/42 |

Primary Examiner—Robert S. Macon
Attorney, Agent, or Firm—Pravel, Wilson & Gambrell

[57] ABSTRACT

An apparatus for generating electricity and power from the natural movement of a body of water including wave action, tide and current having a plurality of floating barges having paddle means driven by the wave, current or tide action and mounted for free rotation about a fixed pivot means in response to changes in the tide or current flow and mounted for up and down movement corresponding to the water level.

5 Claims, 4 Drawing Figures

U.S. Patent  May 10, 1977  Sheet 1 of 2  4,023,041
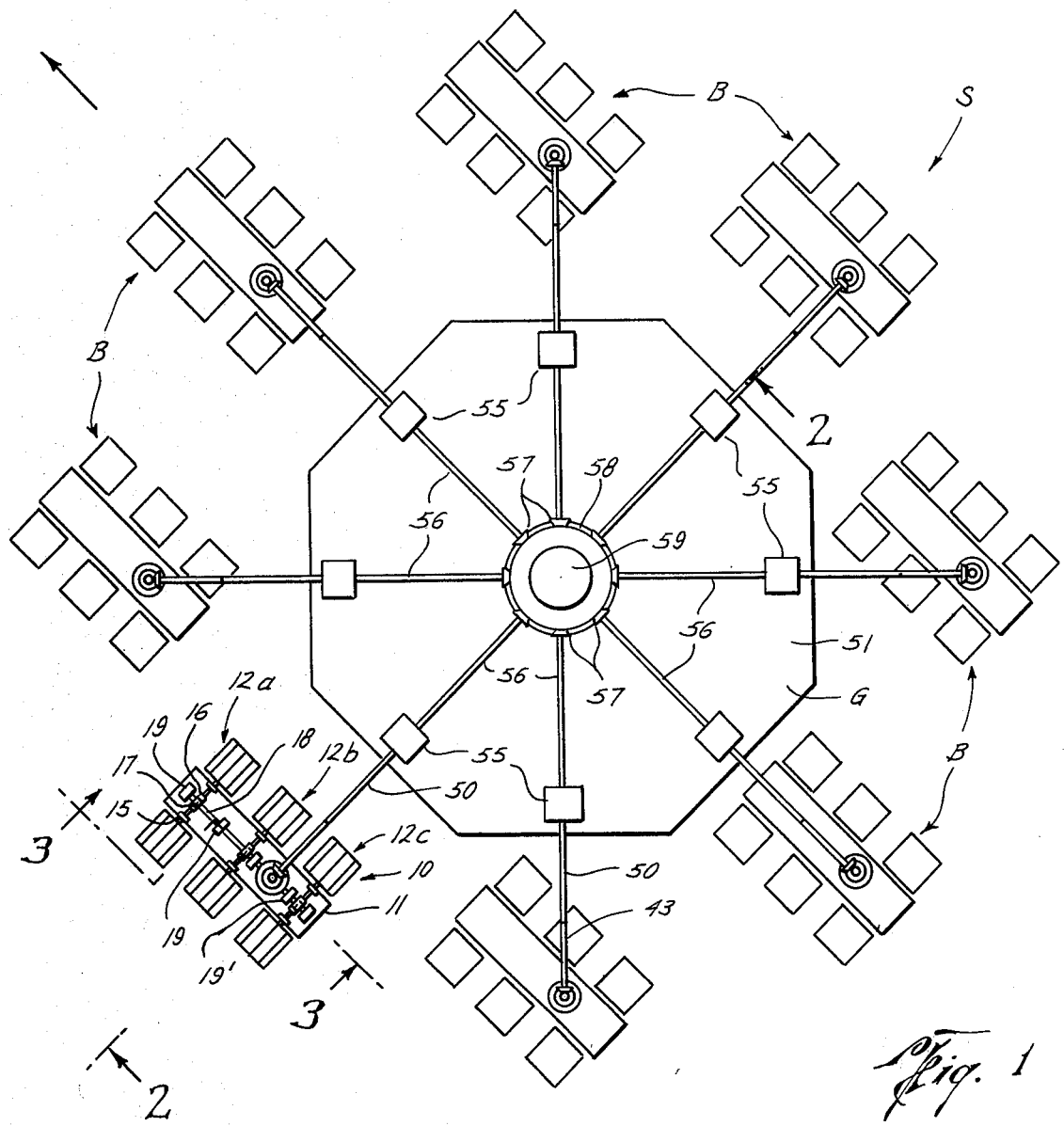
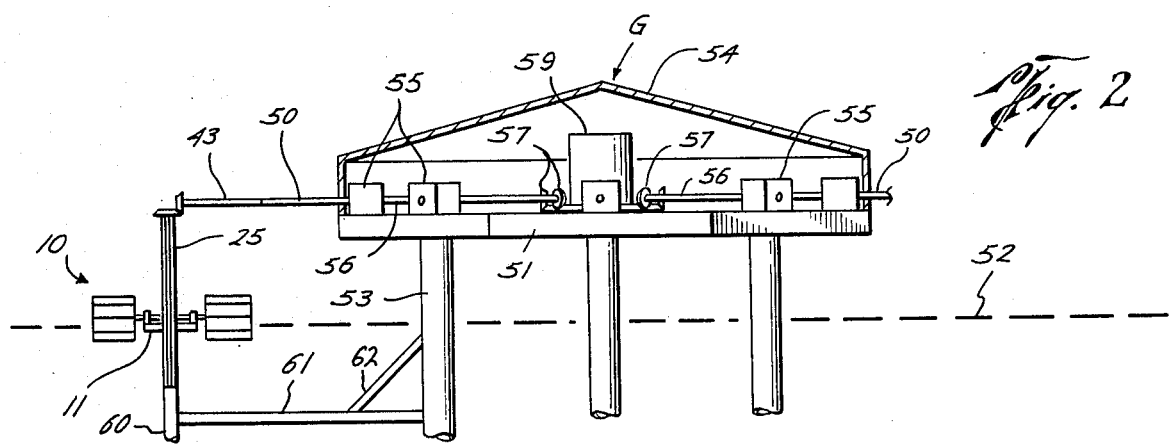

TIDE FLOW →

AIR FLOW HELPS →
← AIR FLOW RIDES OVER

APPARATUS FOR GENERATING ELECTRICITY AND POWER FROM NATURAL WATER FLOW

BACKGROUND OF THE INVENTION

This invention relates generally to an apparatus which converts the movement of the ocean or other body of water into mechanical energy for generating electricity and mechanical power for other uses.

In the prior art, various apparatus have been devised to convert the endless wave action, current or tide of the ocean into mechanical energy which can be used to drive an electrical generator to produce electrical power. These systems have used oscillating paddles as well as rotating paddles to translate the movement of the waves or tide into rotational or reciprocating mechanical energy. U.S. Pat. Nos. 901,117 and 988,508 disclose apparatuses for driving air pumps with reciprocating motion so that the pressurized air produced can be used to drive a generator. U.S. Pat. Nos. 833,361, 1,811,565 and 3,746,875 disclose stationary apparatuses which convert the wave motion to rotary mechanical energy which can be used to drive a generator. U.S. Pat. No. 1,594,826 discloses an apparatus that will automatically adjust itself to the direction of the wave flow to accommodate for changes in the flow direction.

SUMMARY OF THE INVENTION

A new and improved apparatus for converting the natural movement of a body of water into mechanical energy for generating electricity and power.

The preferred embodiment includes a generator platform having a plurality of floating barges with paddle wheel assemblies and mounted with pivot axes to permit the barges to freely rotate 360° about the axes in response to changes in the direction of water movement and to permit up and down movement of the barges in response to changes in the water level. The pivot axes may be mounted with the floor of the body of water or with the platform and the platform may be secured with the floor or may be a floating platform.

BRIEF DESCRIPTION OF THE DRAWINGS

FIG. 1 is a plan view of the apparatus of this invention showing the use of plural apparatuses connected to a single generator.

FIG. 2 is a cross-section taken along section line 2—2 in FIG. 1.

FIG. 3 is a cross-section taken along section line 3—3 in FIG. 1.

FIG. 4 is a cross-section taken along section line 4—4 in FIG. 3.

DESCRIPTION OF THE PREFERRED EMBODIMENTS

In FIG. 1 of the drawings, a generating system is shown having a plurality of floating barges B operatively connected to a generator platform G upon which is mounted a generator for convering the wave motion to electricity or power. Each floating barge is identical in structure so reference can be made to a single barge for the details of structure of each barge.

Figures 3, 4:
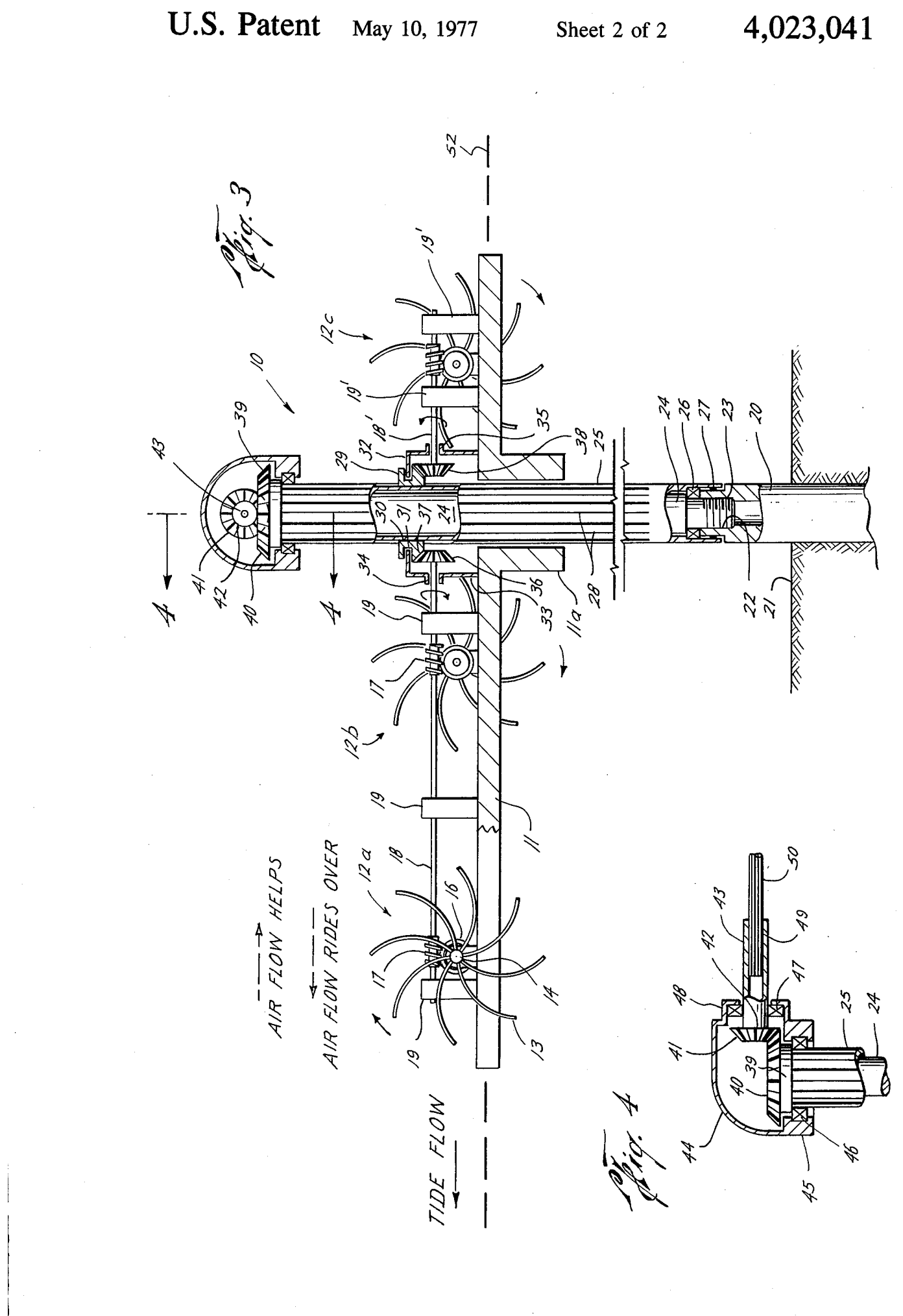

A barge 10 which includes a floating platform 11 which is designed to float at a selected level is shown in detail in FIG. 3 of the drawings. The barge may contain suitable air containers or the like to provide proper buoyancy. Mounted with the floating barge are a plurality of paddle wheel assemblies 12a, 12b and 12c.

Each paddle wheel assembly has a similar construction so specific reference need be made only to one paddle wheel assembly for the detailed structure.

Paddle wheel assembly 12a includes a plurality of paddle vanes 13 which are mounted about a central horizontal shaft 14 in bearings 15 which bearings are secured with the floating platform 11. The curvature of the paddle vanes serves two purposes since the vanes extend out of the water a significant amount. As shown in FIG. 3, with the tide flow in the direction indicated, the wind flowing in the same direction as the water flow will deflect over the paddle vanes so as not to significantly impede the rotation of the paddle vanes as a result of the tide or current flow. When the air flow is flowing in the opposite direction of the wave or tide flow, this will tend to aid or facilitate rotation of the paddle vanes. Secured on the central horizontal shaft 14 is a gear 16 which engages a mating gear 17 which is secured on a barge drive shaft 18. The barge drive shaft 18 is rotatably mounted in bearing support blocks 19 which are secured with the floating barge. It is understood that the paddle wheel assembly 12b includes corresponding structure as that of the paddle wheel assembly 12a. The paddle wheel assembly 12c is mounted to drive a second drive shaft 18' which is rotatably mounted in bearing support blocks 19'. The remaining structure of the paddle wheel assembly 12c is identical to that of paddle wheel assemblies 12a and 12b.

Each floating barge B is mounted for rotation about a stationary post which is secured with the ocean floor or with the generator platform. Since each floating barge is identical, reference again is made to floating barge 10 as shown in detail in FIG. 3. The pivot posts which are secured to the ocean floor, as shown in FIG. 3, or to the generator platform, as shown in FIG. 2, include a base member 20 which forms a fixed pivot post relative to the generator platform. The base member which may be hollow includes threaded socket 22 which receives threaded member 23 of post member 24. Rotatably mounted upon the post member 24 is an elongated splined sleeve 25 which is mounted for rotation about the base member and post member on bearings 26. A suitable seal 27 seals the bearings 26 from the ocean water. The splined sleeve 25 includes a plurality of longitudinally extending splines 28 which transmit the power of the rotating shafts 18 and 18' to the generator as explained hereinafter.

Slidably mounted on the splines 28 is a gear 29 which includes internal teeth 30 which mesh with the splines. The gear 29 is free to ride up and down on the splined sleeve 28 in response to up and down movement of the platform 11 due to changes in the water level. The gear 29 includes a peripheral notch portion 31 which cooperates with the flange member 32 of the support casing 33 to mount the gear 29 with the floating platform 11. The support casing 33 is rigidly secured with the platform and includes the flange member 34 through which the large drive shaft 18 extends. An additional flange member 35 is secured opposite the flange member 34 to receive the second barge drive shaft 18'. A gear 36 is mounted on the large drive shaft 18 to engage the teeth 37 on the gear 29 to transmit the power of the drive shaft to the gear 29. Likewise, gear 38 is secured with the second drive shaft 18' to also engage the teeth 37 to transmit the power of the paddle wheel assembly 12c through the spline shaft 25.

As described above, the rotation of the paddle wheel assemblies 12a, 12b and 12c is transmitted to the vertically sliding gear 29 through gears 37 and 38 and the gear 29 transmits this rotation to the rotating splined sleeve 25. The rise and fall of the water level due to tides and the like causes a corresponding rise and fall of the floating platform 11, with the gear 29 sliding a corresponding amount on the splined shaft 25 to maintain the driving relationship of the splined shaft with the drive shaft. The floating platform includes a mounting means 11a mounting the barge for rotation about the sleeve 25. The length of the splines on the shaft 25 is such as to permit continued engagement with the gear 29 between the lowest tide or water level and the highest tide or water level experienced in a particular body of water. Accordingly, as the dominate direction of the water flow changes, the floating will likewise change to maintain the paddle wheel assemblies at a proper orientation relative to the water flow and in constant operational engagement.

Secured at the upper end of the splined sleeve 25 is a gear 39 having teeth 40 which engage teeth 41 on gear 42. Secured with the gear 42 is a shaft 43 which extends out of casing 44 which is mounted for rotation with the gear 39 and splined sleeve 25. The casing 44 includes a flange member 45 having bearing means 46 rotatably mounting the flange with the gear 39 and splined sleeve 25. The casing 44 serves to shield the gears 39 to as well as mount the shaft 43 in driving engagement with the spline sleeve 25. The shaft 43 extends through bearing means 47 which is mounted in housing 48 which forms a part of the casing 44. The shaft 43 includes internal splines 49 which mate with the splines on the shaft 50. The telescoping movement of the shaft 50 and shaft 43 compensates for the up and down movement of the floating platform 11 due to changes in the water level.

The generator platform G as best shown in FIG. 2 includes a base platform 51 which is supported above the water level 52 by a plurality of posts 53 which posts are preferably secured in the ocean floor. As with semisubmersible drilling rigs, it would be possible to not secure the platform with the ocean floor with large water depths. In such cases, a significant portion of the platform would be preferably submerged for balast and stability. The base platform 51 includes a cover member 54 which shields the internal machinery from the elements. Mounted on the base 51 are a plurality of transmissions 55 which are all identical in structure. The input for the transmissions 55 are the shafts 50 which transmit the rotary power from each floating barge. Each transmission 55 includes suitable gears which increase the speed of input so that output shaft 56 is driven at a higher speed than the input shaft. The end of each output shaft 56 is secured a gear 57 which engages large gear 58 which large gear is rotatably mounted on the base platform 51. Centrally mounted with the base platform is an electrical generator 59 which is operably connected with the large gear 58 so as to be driven thereby to generate electricity. Suitable conductor cables are also connected with the generator to transmit the power to a receiving station (not shown). While eight floating barges are shown in FIG. 1, it is understood that this number could be varied.

As shown in FIG. 2, a pivot post 60 may be secured to the platform posts through cantilever beams 61 having suitable bracing 62. This application would be particularly suitable in circumstances where the water depth is relatively deep and it would be prohibitive to install the pivot posts from the ocean floor.

The operation of the apparatus of this invention can be best understood with reference to FIG. 1. As shown in this figure of the drawings, the plurality of barges are shown oriented in the direction of the movement of the water as indicated by the arrow. This orientation is provided by the mounting of the barges on individual pivot axes that allows free rotation of the barges about 360 degrees. This free rotation enables the barges to be positioned in the optimal direction for obtaining the most amount of energy from the movement of the body of water. In the case of a floating generator platform, which might be subject to some changes of position in the water, the floating barges would maintain their proper orientation notwithstanding minor changes in the position of the platform. In the case that the apparatus of this invention was used in a body of water having a relatively steady current, the barges would have limited rotation to accommodate minor changes in the flow of the body of water. However, in the case of the use of this apparatus in situations involving changing tides in bays, offshore, etc., the 360° rotation would allow proper orientation of the barges for reversal of the tide flow which periodically would occur. The free rotation of the barges and the up and down movement of the floating barges would facilitate optimum positioning of the barges in accordance with the direction of the flow in a body of water.

While all of the power from the barges is shown as being used to generate electricity from the generator, other applications of the power are possible. In the case of offshore oil exploration, the platform could double as a drilling rig and the rotary power could be used to drive pumps or the like. These situations could involve the use of a jack-up or semi-submersible drilling rig as a platform with power generating barges connected with the rig. Anchors could be used in the case of semi-submersible rigs to maintain the rig at a relatively stationary position in a body of water.

Whether mounted with a fixed platform or a movable platform, the barges would automatically orient themselves to the optimum position to derive power from the water flow. The barges would likewise automatically adjust to changes in water depth which would alleviate the need for an operation constantly controlling the barge position. The 360 degree rotation of the barges would permit their adjustment or orientation to meet any flow change.

The foregoing disclosure and description of the invention are illustrative and explanatory thereof, and various changes in the size, shape and materials as well as in the details of the illustrated construction may be made without departing from the spirit of the invention.

I claim:

1. An apparatus for generating electricity and power from wave, current and tide action of a body of water, comprising:

a pivot means having a generally vertical axis of rotation which is mounted with a platform in the body of water;

a floating barge laterally spaced from the platform having means mounting the barge with the pivot means for free rotation of the barge means about the axis of the pivot means in response to changes in the direction of water flow and for vertical movement of the barge relative to the axis of the pivot means in response to changes in the water level;

paddle means with the barge means for engagement by the water for converting the force of the water to rotating motion;

generator means on the platform having drive means operatively connected with the paddle means for converting the rotary motion to electricity and power;

the pivot means having a vertical post fixed relative to the platform and the pivot means having a splined sleeve having means mounting the splined sleeve for rotation on the post;

the barge means having means mounting the barge means for free rotation and vertical movement about the splined sleeve; and the paddle means having drive means operatively connected with the splined sleeve to drive the splined sleeve upon rotation of the paddle means.

2. The apparatus as set forth in claim 1, wherein: the generator means having a second drive means operatively connected with the splined sleeve to drive the generator means to produce electricity.

3. The apparatus as set forth in claim 1, wherein: the splined sleeve having vertical longitudinal splines extending from the low tide level to the high tide level.

4. The apparatus as set forth in claim 1, wherein: the generator means having a platform supporting an electric generator and spaced from the pivot means to permit rotation of the barge means about the pivot means.

5. The apparatus as set forth in claim 4, wherein: a plurality of pivot means each with barge means having paddle means which are laterally positioned from the platform at intervals about the platform; and the generator means having drive means operatively connected with the plurality of barge means for converting the rotary motion of the paddle means to electricity and power.

* * * * *